United States Patent Office 3,538,153
Patented Nov. 3, 1970

3,538,153
2,3-DIHALOACRYLANILIDES
David I. Randall, Easton, Pa., assignor to GAF Corporation, New York, N.Y., a corporation of Delaware
No Drawing. Continuation-in-part of application Ser. No. 617,821, Feb. 23, 1967. This application Apr. 13, 1967, Ser. No. 630,527
Int. Cl. C07c 103/66, 103/60
U.S. Cl. 260—518                                7 Claims

ABSTRACT OF THE DISCLOSURE

The compounds are of the class of 2,3-dihaloacrylanilides and are represented by the following structural formula:

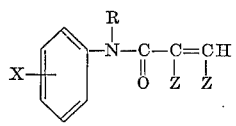

wherein X represents at least one negatively substituted group such as chloro, bromo, iodo, fluoro, nitro, carboxy, sulfonamido, alkyl, haloalkyl and aryl; wherein R is either hydrogen or alkyl; and wherein Z is either chloro or bromo. The compounds possess herbicidal activity and may also be employed as corrosion inhibitors or as additives for lube oils. The compounds are produced by the amidation of a primary or secondary aromatic amine with a 2,3-dihaloacryloyl halide.

---

This invention relates to novel substituted acrylanilides and more particularly to novel substituted 2,3-dihaloacrylanilides and to a process for their production.

This application is a continuation-in-part of my co-pending application Ser. No. 617,821, filed Feb. 23, 1967, now abandoned.

Various unsubstituted anilides of dihaloacrylic acid are known to the art and additionally selected compounds have been suggested as disinfectants (see C.A. 60, 1688 and DRP 261,689). However, such unsubstituted haloacrylanilides have not previously been known as herbicides nor has their value as phytotoxic agents been suggested. It has been surprisingly found that substituted haloacrylanilides of this invention possess not only general herbicidal activity but more importantly, exhibit phytotoxicity against particular weeds heretofore difficult to control, namely aquatic weeds.

It is, therefore, an object of this invention to provide novel substituted haloacrylanilides.

Another object of this invention is to provide a process for producing substituted haloacrylanilides.

A further object of this invention is to provide substituted haloarylanilides which possess selective herbicidal activity.

Other objects and advantages will become apparent from the following more complete description and claims.

Broadly, this invention contemplates as a new chemical composition a 2,3-dihaloacrylanilide corresponding to the formula:

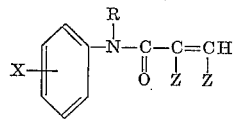

where X represents a substitution on a phenyl ring of one or more of the following negatively substituted groups: chloro, bromo, iodo, fluoro, nitro, carboxy, sulfonamido, alkyl, haloalkyl or aryl; where R represents hydrogen or an alkyl radical having from 1–4 carbon atoms; and where Z represents a halogen such as chloro or bromo.

Representative compounds falling within the scope of this invention include:

2,3,3'-trichloroacrylanilide
2,2',3,4'-tetrachloroacrylanilide
2'-methoxy-4'-nitro-2,3,4'-trichloroacrylanilide
2,2',3-trichloroacrylanilide
2,3-dichloro-4'-carboxy acrylanilide
2,3-dichloro-3'-carboxy acrylanilide
3'-carboxy-2,2',3,5'-tetrachloroacrylanilide
4'-nitro-2,3-dichloroacrylanilide
3'-trifluoromethyl-2,3,4'-trichloroacrylanilide
2',4'-dinitro-2,3-dichloroacrylanilide
1,3-di(2,3-dichloroacrylamido) benzene The substituted 2,3-dihaloacrylanilides described herein represent a heretofore unknown class of herbicides. The compounds of this invention may also be employed as oil additives such as anti-wear and corrosion inhibitors and are additionally useful as precursors for other biologically active compounds including fungicides.

In particular, the substituted 2,3-dihaloacrylanilides of this invention possess surprising activity with regard to the control and eradication of selected submerged aquatic weeds. Aquatic weeds, in general, create major operational problems for irrigation systems, so much so, that the continued uncontrolled plant growth cause, among other problems, a reduction in water carrying capacity exceeding in many instances 50% of design capacity. To cope with submerged weeds, two generally known methods have previously been employed to control growth namely, the use of aromatic solvents and mechanical control methods. The compounds presented herein provide another means for combating aquatic weeds and particularly waterweed (*Elodea canadensis*) and pondweed (*Potamogeton nodosus*).

The novel compounds of this invention may be prepared by the amidation of an amine corresponding to the formula XR'(R)NH where X and R have the meaning given above and where R' is aryl by reaction with a 2,3-dihaloacryloyl halide in the presence of an acid acceptor.

The amidation reaction of the appropriate primary or secondary amine with 2,3-dihaloacryloyl halide may be represented by the following equation:

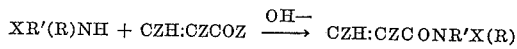

While this reaction may in many cases be carried out by mixing and reacting together the amine and the dihaloacryloyl halide in the presence of an acid acceptor, it is preferably carried out in an inert solvent. As examples of suitable solvents may be mentioned benzene, toluene, dimethylformamide, dioxane, dimethylsulfoxide, diethyl ether, chlorobenzene, hexane, methyl ethyl ketone, etc., chlorinated solvents such as carbon tetrachloride, chloroform, chlorobenzene and the like, or mixtures of the above mentioned organic solvents in the presence or absence of water. Acid acceptors which may be used, include any suitable alkali such as alkali metal oxides, hydroxides, alkoxides and the like, e.g. sodium or potassium hydroxides such as calcium oxide, calcium hydroxide, alkaline reacting salts of a strong base and a weak acid such as alkali metal carbonates, or bicarbonates, e.g. sodium or potassium carbonate or bicarbonate, sodium acetate and the like, alkaline salts such as trisodium phosphate, or if desired, an excess of primary or secondary amino starting products.

The temperature of the reaction is not critical and temperatures ranging from 0–210° C. have been found to be operative. Preferably temperatures of from room temperature to 150° C. are generally employed and the reaction may be conveniently carried out at reflux using a solvent boiling at about the reaction temperature desired.

Examples of dihaloacryloyl halides useful as starting materials include:

α,β-dichloroacryloyl chloride
α,β-dibromoacryloyl bromide
α,β-dibromoacryloyl chloride
α,β-dichloroacryloyl bromide
α-bromo-β-chloroacryloyl bromide
α-chloro-β-bromoacryloyl chloride Illustrative of the amines falling within the formula XR′(R)NH and reactive with the above mentioned dihaloacryloyl halides are:

m-chloro aniline
4-chloro-2-anisidine
2,4-dichloro aniline
5-nitro-4-chloro-2-anisidine
o-chloro aniline
p-aminobenzoic acid
m-aminobenzoic acid
2,5-dichloro-3-aminobenzoic acid
sodium salt of 2,5-aminobenzoic acid
3,4-dichloro aniline
sulfanilamide
p-nitro aniline
4-chloro-3-trifluoromethyl aniline The following examples are included herein solely by way of illustration and are not intended to be construed as limitations upon this invention.

EXAMPLE I

A solution of (.04 mole) 6.4 grams of dichloroacryloyl chloride in 100 cc. of diethyl ether was added dropwise to a cooled solution of (.08 mole) 10.2 grams of metachloro aniline in 100 cc. of diethyl ether. The hydrochloride of metachloro aniline precipitated immediately and the mixture was filtered to remove the hydrochloride. The ether layer was washed twice with water and evaporated. 7.3 grams of 2,3,3′-trichloroacrylanilide was recovered as a white crystalline solid having a melting point ranging from 85–90° C.

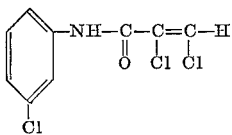

EXAMPLE II

A solution of 12.6 grams (.08 mole) of 4-chloro-2-anisidine in 100 cc. of diethyl ether was added to a solution of 8.0 grams of sodium bicarbonate dissolved in 200 cc. of water. To this mixture was added 8.5 cc. of dichloroacryloyl chloride (.08 mole). After stirring for two hours the ether was evaporated off and the white crystalline precipitate was removed by filtration. 16.8 grams of 2′-methoxy-2,3,4′-trichloroacrylaniline was recovered after crystallization from methanol as a white crystalline solid having a melting point ranging from 115–117° C.

EXAMPLE III

The procedure of Example II was followed using 13 grams of 2,4-dichloro aniline as starting amine. 15.3 grams of 2,2′,3,4′-tetrachloroacrylanilide was recovered and had a melting point ranging from 117–118° C.

EXAMPLE IV

A solution of 16.2 grams (.08 mole) of 5-nitro-4-chloro-2-anisidine in 100 cc. of diethyl ether was added over a layer of 200 cc. of water containing 8.0 grams of sodium bicarbonate. With stirring, 8.5 cc. (.08 mole) of dichloroacryloylchloride was added and, thereafter, stirring was continued for two hours at room temperature whereupon the ether was evaporated off and the solid portion filtered off. A pale yellow precipitate was recrystallized from 1.5 liters of ethanol and 13.7 grams of 2′-methoxy-5′-nitro-2,3,4′-trichloroacrylanilide having a melting point ranging from 205–208° C. was recovered.

EXAMPLE V

The procedure of Example II was followed using 10.2 grams (.08 mole) of o-chloroaniline as starting amine. 17.4 grams of 2,2′,3-trichloroacrylanilide was recovered and had a melting point ranging from 94—96° C.

EXAMPLE VI 11.0 grams (.08 mole) of p-aminobenzoic acid was dissolved in 200 cc. of water containing 13 grams of sodium bicarbonate. The solution was cooled in an ice bath while adding dropwise 100 cc. of diethyl ether having dissolved therein 8.56 (.08 mole) of dichloroacryloylchloride. After stirring two hours, the ether was evaporated off and the pH of the solution was brought to three with the addition of HCl. The white precipitate was filtered and washed with water until neutral. 18.6 grams of 2,3-dichloro-4′-carboxy acrylanilide was recovered having a melting point ranging from 239–242° C.

EXAMPLE VII

Procedure of Example VI was followed using 11 grams of m-aminobenzoic acid. 19.4 grams of 2,3-dichloro-4′-carboxy acrylanilide was recovered and had a melting point ranging from 214–216° C.

EXAMPLE VIII 20.0 grams (.08 mole) of the sodium salt of 2,5-dichloro-3-aminobenzoic acid was dissolved in 300 cc. of water containing 8.5 grams of sodium bicarbonate. The solution was cooled in an ice salt bath to 15° C. and thereafter to this solution was added dropwise 8.5 cc. (.08 mole) of dichloroacryloyl chloride in 75 cc. of diethyl ether. The resultant two phase system was stirred for two hours and the ether was thereafter evaporated. The solution was next acidified with HCl, stirred for an additional half hour and the precipitate was thereafter filtered, washed and dried. 20.8 grams of 3′-carboxy-2,2′,3,5′-tetrachloroacrylanilide having a melting point ranging from 194–196° C. was recovered.

EXAMPLE IX

A solution of 16.9 cc. (.16 mole) of dichloroacryloyl chloride in 100 cc. of diethyl ether was added dropwise to a two phase system, maintained at a temperature of 10°, of 25.9 grams of 3,4-dichloroaniline (.08 mole) in 200 cc. of diethyl ether covering a solution of 16.8 grams of sodium bicarbonate in 400 cc. of water. After stirring for several hours at room temperature, the ether was evaporated off and the solid portion filtered and recrystallized from methanol. 28.3 grams of white, crystalline 2,3,3′,4′-tetrachloroacrylanilide was recovered having a melting point ranging from 93.5–95° C.

EXAMPLE X

The procedure employed in Example I was followed using sulfanilamide as starting amine. The product 4′-sulfamyl-2,3-dichloroacrylanilide was recovered and had a melting point ranging from 218–221° C.

EXAMPLE XI

The procedure of Example IX was followed employing p-nitro aniline as starting amine. The product 4′-nitro-2,3-dichloroacrylanilide was recovered and had a melting point ranging from 172–173° C.

EXAMPLE XII

The procedure of Example IX was followed using as starting amine 4-chloro-3-trifluoromethyl aniline. The product 3′ - trifluoromethyl - 2,3,4′ - trichloroacrylanilide was recovered and had a melting point ranging from 74–77° C.

EXAMPLE XIII 31.5 grams of 4'-nitro-2,3-dichloroacrylanilide as prepared in Example XI were dissolved in 150 cc. of 96% sulfuric acid at 5–10° C. To this solution was added 22.8 grams of ⅓ nitric acid, ⅔ sulfuric acid and the mixture was stirred for six hours at a temperature of 30–32° C. The mixture was thereafter drowned in ice and water, filtered and washed. The product 4',6'-dinitro-2,3-dichloroacrylanilide having a melting point ranging from 114–119° C. was recovered.

Compounds of this invention were evaluated as aquatic weed herbicides as follows:

Waterweed (Elodea) and pondweed (Potamogeton) shoots were placed in glass gallon jars containing an aqueous acetone solution of 10 parts per million of the designated test herbicide along with plant nutrient. The plant species under test remained in the herbicide solution for three weeks and were permitted exposure to light. The individual herbicide's effectiveness was evaluated at the end of the three week period.

In the first series of tests, Elodea shoots were exposed to separate test solutions as described above containing the following respective herbicides:

(a) 2,3-dichloroacrylanilide (Control)
(b) 2,3-dichloro-2',4'-dinitroacrylanilide
(c) 2,2',3,4',5'-pentachloroacrylanilide
(d) 2,3,3',4'-tetrachloroacrylanilide Visual observation at the end the three week period showed that compound (a) representing an unsubstituted acrylanilide, demonstrated only slight phytotoxicity affecting a very limited number of aquatic plant leaves, whereas the substituted acrylanilides of this invention represented by compounds (b), (c) and (d) demonstrated severe phytotoxicity in that the plant shoot was totally destroyed or in one instance only a slight greeness remained in the stem and where all leaves were destroyed.

In another series of tests, pondweed shoots were exposed to:

(a) 3,3',4'-trichloroacrylanilide;
(b) 2,3-dichloroacrylanilide as controls and to compounds falling within the scope of this invention;
(c) 2,3,3',4'-tetrachloroacrylanilide; and
(d) 2,2',3-trichloroacrylanilide.

Visual examination after the three week period demonstrated that the control compounds had only slight phytotoxic activity against pondweed shoots whereas the compounds of this invention either completely destroyed the shoot and leaves or totally destroyed the leaves and left only a slight greeness to the stem.

While this invention has been described in terms of certain preferred embodiments and illustrated by means of specific examples, these are illustrative only and the invention is not to be construed as limited except as set forth in the following claims.

What I claim is:

1. A 2,3-dihaloacrylanilide compound of the formula:

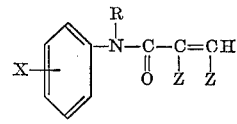

wherein X represents at least one negative radical selected from the group consisting of Cl, $NO_2$, sulfamyl, carboxy, methoxy and trifluoromethyl; R is selected from the group consisting of H and alkyl of 1–4 carbon atoms; and Z is a halogen selected from chloro and bromo.

2. The compound of claim 1 wherein R is hydrogen.
3. The compound of claim 1 wherein X and Z are Cl.
4. The compound of claim 1 wherein X is $NO_2$ and Z is Cl.
5. The compound of claim 1 wherein X is carboxy and Z is Cl.
6. The compound of claim 1 wherein X is sulfamyl and Z is Cl.
7. The compound of claim 1 wherein X is trifluoromethyl and Z is Cl.

References Cited
UNITED STATES PATENTS 3,100,226    8/1963    Raman et al. _____ 260—518

LORRAINE A. WEINBERGER, Primary Examiner

L. A. THAXTON, Assistant Examiner

U.S. Cl. X.R.

71—66; 260—556, 562